United States Patent [19]
Aggarwal et al.

[11] Patent Number: 6,092,064
[45] Date of Patent: Jul. 18, 2000

[54] ON-LINE MINING OF QUANTITATIVE ASSOCIATION RULES

[75] Inventors: Charu Chandra Aggarwal, Ossining; Philip Shi-Lung Yu, Chappaqua, both of N.Y.

[73] Assignee: International Business Machines Corporation, Armonk, N.Y.

[21] Appl. No.: 08/964,064

[22] Filed: Nov. 4, 1997

[51] Int. Cl.[7] .................................................. G06F 17/30
[52] U.S. Cl. .................................... 707/6; 707/2; 707/10
[58] Field of Search ...................................... 707/2, 6, 10

[56] References Cited

U.S. PATENT DOCUMENTS

| | | | |
|---|---|---|---|
| 5,615,341 | 3/1997 | Agrawal et al. | 705/10 |
| 5,664,171 | 9/1997 | Agrawal et al. | 707/2 |
| 5,724,573 | 3/1998 | Agrawal et al. | 707/6 |
| 5,794,209 | 8/1998 | Agrawal et al. | 705/10 |
| 5,819,266 | 10/1998 | Agrawal et al. | 707/6 |

FOREIGN PATENT DOCUMENTS

0810807 A2   12/1997   European Pat. Off. ....... H04Q 11/04

OTHER PUBLICATIONS

Kaufman, K., et al., "Mining for Knowledge in Databases: Goals and General Description of the Inlen System", Knowledge Discovery in Databases, pp. 449–462(1991).

Zhang, K., "On Rough Sets and Interference Analysis", Cambridge University Computer Laboratory, pp. 256–265, (1997).

Agrawal, Rakesh et al. "Database Mining: A Performance Perspective", IEEE Transaction on knowledge and Data Engineering, vol. 5, No. 6, Dec. 1993.

Bergamo, Lisa "Silicon Graphics introduces MineSet", PR Newswire Apr. 16, 1996, Dateline: San Francisco, CA Apr. 1996.

Cheung, David et al., "Maintenance of Discovered Association Rules in Large Databases: An Incremental Updating Technique", 1996 IEEE Feb. 1996.

Edelstein, Herb "Mining for gold", Informationweek n627, pp. 53–70, ISSN:8750–6874, Apr. 21, 1997.

Fayyad, Usama et al., "The KDD Process for Extracting Useful Knowledge from Volumes of Data", Http://www.research.microsoft.com/research/datamine/CACM–DM–refs/ .ACM Feb. 1996.

Hedberg, Sara "Parallelism Speeds Data Mining", IEEE Parallel & Distributed Technology, vol. 3, Issue 4, Dec. 1995.

Houtsma, Maurice et al., "Set–Oriented Mining for Association Rules in Relational Databases", Feb. 1995 IEEE pp. 25–33 Feb.

Moxon, Bruce "Defining data Mining", DBMS Aug. 1996 v9 n9 ps11 (3).

Antonin Guttman, "R–Trees: A Dynamic Index Structure For Spatial Searching", *ACM*, 1984, pp. 47–57.

(List continued on next page.)

*Primary Examiner*—Wayne Amsbury
*Assistant Examiner*—Shahid Alam
*Attorney, Agent, or Firm*—Scully, Scott, Murphy & Presser; Kevin M. Jordan, Esq.

[57] ABSTRACT

A computer method of online mining of quantitative association rules consisting of two stages, a preprocessing stage followed by an online rule generation stage. The required computational effort is reduced by the pre-processing stage, defined by pre-processing data to organize the relationship between antecedent attributes to create a heirarchially arranged multidimensional indexing structure. The resulting structure facilitates the performance of the second stage, online processing, which involves the generation of quantitative association rules. The second stage, online rule generation, utilizes the multidimensional index structure created by the preprocessing stage by first finding the areas in the data which correspond to the rules and then uses a merging step to create a merged tree in order to carefully combine interesting regions in order to give a heirarchical representation of the rule set. The merged tree is then used in order to actually generate the rules.

38 Claims, 8 Drawing Sheets

OTHER PUBLICATIONS

Jong Soo Park, et al., "An Effective Hash–based Algorithm for Mining Association Rules", *ACM,* 1995, pp. 175–186.

Charu C. Aggarwal, et al., "Online Generation of Association Rules", *Research Report,* Computer Science/Mathematics, RC20899 (92609), Jun. 24, 1997, pp. 1–23.

Ramakrishnan Srivant, et al., "Mining Quantitative Association Rules in Large Relational Tables", *ACM,* 1996, pp. 1–12.

Rakesh Agrawal, et al., "Mining Association Rules Between Sets of Items in Large Databases",*ACM,* 1993, pp. 207–216.

Rakesh Agrawal, et al., "Fast Algorithms for Mining Association Rules", Proceedings of the 20th VLDB Conference, Santiago, Chile, 1994, pp. 487–499.

Ramakrishnan Srikant, et al., "Mining Generalized Association Rules", Proceedings of the 21st VLDB Conference, Zurich, Switzerland, 1995, pp. 407–419.

Charu Aggarwal, et al., "The S–Tree: An Efficient Index for Multidimensional Objects", Proceddings of the International Symposium on Spatial Databases, Jul. 1997, pp. 350–370.

Note: Null nodes contain no rules.

ON-LINE MINING OF QUANTITATIVE ASSOCIATION RULES

BACKGROUND OF THE INVENTION

1. Field of the Invention

The present invention relates generally to online searching for data dependencies in large databases and more particularly to an online method of data mining of data items to find quantitative association rules, where the data items comprise various kinds of quantitative and categorical attributes.

2. Discussion of the Prior Art

Data mining, also known as knowledge discovery in databases, has been recognized as a new area for database research. The volume of data stored in electronic format has increased dramatically over the past two decades. The increase in use of electronic data gathering devices such as point-of-sale or remote sensing devices has contributed to this explosion of available data. Data storage is becoming easier and more attractive to the business community as the availability of large amounts of computing power and data storage resources are being made available at increasingly reduced costs.

With much attention focused on the accumulation of data, there arose a complimentary need to focus on how this valuable resource could be utilized. Businesses soon recognized that valuable insights could be gleaned by decision-makers who could make use of the stored data. By using data from bar code companies, or sales data from catalog companies, it is possible to gain valuable information about customer buying behavior. The derived information might be used, for example, by retailers in deciding which items to shelve in a supermarket, or for designing a well targeted marketing program, among others. Numerous meaningful insights can be unearthed from the data utilizing proper analysis techniques. In the most general sense, data mining is concerned with the analysis of data and the use of software techniques for finding patterns and regularities in sets of data. The objective of data mining is to source out discernible patterns and trends in data and infer association rules from these patterns.

Data mining technologies are characterized by intensive computations on large volumes of data. Large databases are definable as consisting of a million records or more. In a typical application, end users will test association rules such as; "75% of customers who buy Cola also buy corn chips", where 75% refers to the rule's confidence factor. The support of the rule is the percentage of transactions that contain both Cola and corn chips.

To date the prior art has not addressed the issue of online mining but has instead focused on an itemset approach. IBM's Almaden's project called Quest is based upon this method. A significant drawback of the itemset approach is that as the user tests the database for association rules at differing values of support and confidence, multiple passes have to be made over the database, which could be of the order of Gigabytes. For very large databases, this may involve a considerable amount of I/O and in some situations, it may lead to unacceptable response times for online queries. A user must make multiple queries on a database because it is difficult to guess apriori, how many rules might satisfy a given level of support and confidence. Typically one may be interested in only a few rules. This makes the problem all the more difficult, since a user may need to run the query multiple times in order to find appropriate levels of minimum support and minimum confidence in order to mine the rules. In other words, the problem of mining association rules may require considerable manual parameter tuning by repeated queries, before useful business information can be gleaned from the transaction database. The processing methods of mining described heretofore are therefore unsuitable to repeated online queries as a result of the extensive disk I/O or computation leading to unacceptable response times. The need for expanding the capabilities of data mining to the internet requires dynamic online methods rather than the batch oriented method of the itemset approach. It is therefore a primary object of the invention to provide a computationally efficient method for making online queries on a database to evaluate the strength of association rules utilizing user supplied levels of support and confidence as predictors.

It is a further object object of the invention to discover quantitative association rules.

SUMMARY OF THE INVENTION

The present invention is directed to a method for efficiently performing online mining of quantitative association rules. An association rule can be generally defined as a conditional statement that suggests that there exists some correlation between its two component parts, antecedent and consequent. In a quantitative association rule both the antecedent and consequent are composed from some user specified combination of quantitative and categorical attributes. Along with the proposed rule, the user would provide three additional inputs representing the confidence and support level of interest to the user and a value referred to as interest level. These inputs provide an indication of the strength of the rule proposed by the user (the user query). In other words the strength of the suggested correlation between antecedent and consequent defined by the user query.

In order to carry out the object of the present invention, there is disclosed, a method for preprocessing the raw data by utilizing the antecedent attributes to partition the data so as to create a mutidimensional indexing structure, followed by an online rule generation step. By effectively pre-processing the data into an indexing structure it is placed in a form suitable to answer repeated online queries with practically instantaneous response times. Once created, the indexing structure obviates the need to make multiple passes over the database. The indexing structure creates significant performance advantages over previous techniques. The indexing structure (pre-processed data) is stored in such a way that online processing may be done by applying a graph theoretic search algorithm whose complexity is proportional to the size of the output. This results in an online algorithm which is practically instantaneous in terms of response time, minimizing excessive amounts of I/O or computation.

BRIEF DESCRIPTION OF THE DRAWINGS

FIG. 2 is an overall description of the method performed by the invention. It consists of two stages described by FIGS. 2(a) and 2(b).

DESCRIPTION OF THE PREFERRED EMBODIMENTS

The present invention is directed to a method for online data mining of quantitative association rules. Traditional database queries consisting of simple questions such as "what were the sales of orange juice in January 1995 for the Long Island area?". Data mining, by contrast, attempts to source out discernible patterns and trends in the data and infers rules from these patterns. With these rules the user is then able to support, review and examine decisions in some related business or scientific area. Consider, for example, a supermarket with a large collection of items. Typical business decisions associated with the operation concern what to put on sale, how to design coupons, and how to place merchandise on shelves in order to maximize profit, etc. Analysis of past transaction data is a commonly used approach in order to improve the quality of such decisions. Modern technology has made it possible to store the so called basket data that stores items purchased on a per-transaction basis. Organizations collect massive amounts of such data. The problem becomes one of "mining" a large collection of basket data type transactions for association rules between sets of items with some minimum specified confidence. Given a set of transactions, where each transaction is a set of items, an association rule is an expression of the form X=>Y, where X and Y are sets of items.

An example of an association rule is: 30% of transactions that contain beer also contain diapers; 2% of all transactions contain both of these items". Here 30% is called the confidence of the rule, and 2% the support of the rule.

Another example of such an association rule is the statement that 90% of customer transactions that purchase bread and butter also purchase milk. The antecedent of this rule, X, consists of bread and butter and the consequent, Y, consists of milk alone. Ninety percent is the confidence factor of the rule. It may be desirable, for instance to find all rules that have "bagels" in the antecedent which may help determine what products (the consequent) may be impacted if the store discontinues selling bagels.

Given a set of raw transactions, D, the problem of mining association rules is to find all rules that have support and confidence greater than the user-specified minimum support (minsupport s) and minimum confidence (minconfidence c). Generally, the support of a rule X=>Y is the percentage of customer transactions, or tuples in a generalized database, which contain both X and Y itemsets. In more formal mathematical terminology, the rule X=>Y has support s in the transaction set D if s% of transactions in D contain X union Y, X V Y. The confidence of a rule X=>Y is defined as the percentage of transactions that contain X which also contain Y. Or more formally, the rule X=>Y has confidence c in the transaction set D if c% of transactions in D that contain X also contain Y. Thus if a rule has 90% confidence then it means that 90% of the transactions containing X also contain Y.

As previously stated, an association rule is an expression of the form X=>Y. For example if the itemsets X and Y were defined to be X=[milk & cheese & butter]
Y=[eggs & ham] respectively The rule may be interpreted as:

RULE: X=>Y, implies that given the occurrence of milk, cheese and butter in a transaction, what is the likelihood of eggs and ham appearing in that same transaction to within some defined support and confidence level.

The support and confidence of the rule collectively define the strength of the rule. There are a number of ways in which a user may pose a rule to such a system in order to test its strength. A non-inclusive yet representative list of the kinds of online queries that such a system can support include;

(1) Find all association rules above a certain level of minsupport and minconfidence.

(2) At a certain level of minsupport and minconfidence, find all association rules that have the set of items X in the antecedent.

(3) At a certain level of minsupport and minconfidence, find all association rules that have the set of items Y in the consequent.

(4) At a certain level of minsupport and minconfidence, find all association rules that have the set of items Y either in the antecedent or consequent or distributed between the antecedent and consequent.

(5) Find the number of association rules/itemsets in any of the cases (1), (2), (3), (4) above.

(6) At what level of minsupport do exactly k itemsets exist containing the set of items Z.

The present method particularizes the method of discovering general association rules to finding quantitative rules from a large database consisting of a set of raw transactions, D, defined by various quantitative and categorical attributes.

For example, a typical quantitative/categorical database for a general marketing survey would consist of a series of records where each record reflects some combination of consumer characteristics and preferences;

Record (1)=age=21, sex=male, homeowner=no
Record (2)=age=43, sex=male, homeowner=yes
Record (3)=age=55, sex=female, homeowner=no In general, a quantitative association rule is a condition of the form;

GENERAL RULE:

X1[l1 . . . u1], X2[l2 . . . u2] . . . Xk[lk . . . uk] Y1=c1, Y2=c2 . . . Yr=cr=>Z1=z1, Z2=z2 where X1, X2, . . . Xk correspond to quantitative antecedent attributes, and Y1, Y2, . . . Yr, and C correspond to categorical antecedent attributes. Here [l1 . . . u1], [l2 . . . u2], . . . [l k . . . uk] correspond to the ranges for the various quantitative attributes. Z1 and Z2 correspond to a multiple consequent condition.

The present method requires that a user supply three inputs, a proposed rule, otherwise referred to as the user query, in the form of an antecedent/consequent pair. In addition to the proposed rule a user would supply values for minimum required confidence (minconfidence=c), and minimum required support, (minsupport=s), to test the strength of the proposed rule (user query).

Both the minimum confidence and and minimum support are as relevant to the discovery of quantitative association rules as they are to the discovery of general association rules. An example of a typical user input might be;

EXAMPLE A

Typical User Input

1. User supplies a proposed Rule to be tested (query)

| ANTECEDENT CONDITION | CONSEQUENT CONDITION |
|---|---|
| Age[20–40],Salary[100k–200k], Sex=Female | => Cars=2 |

2. User supplies a confidence value for the proposed rule, referred to as minconfidence, c. Minconfidence=50%

3. User supplies a support value for the proposed rule, Minsupport, s.

Minsupport=10%

Figure 1:
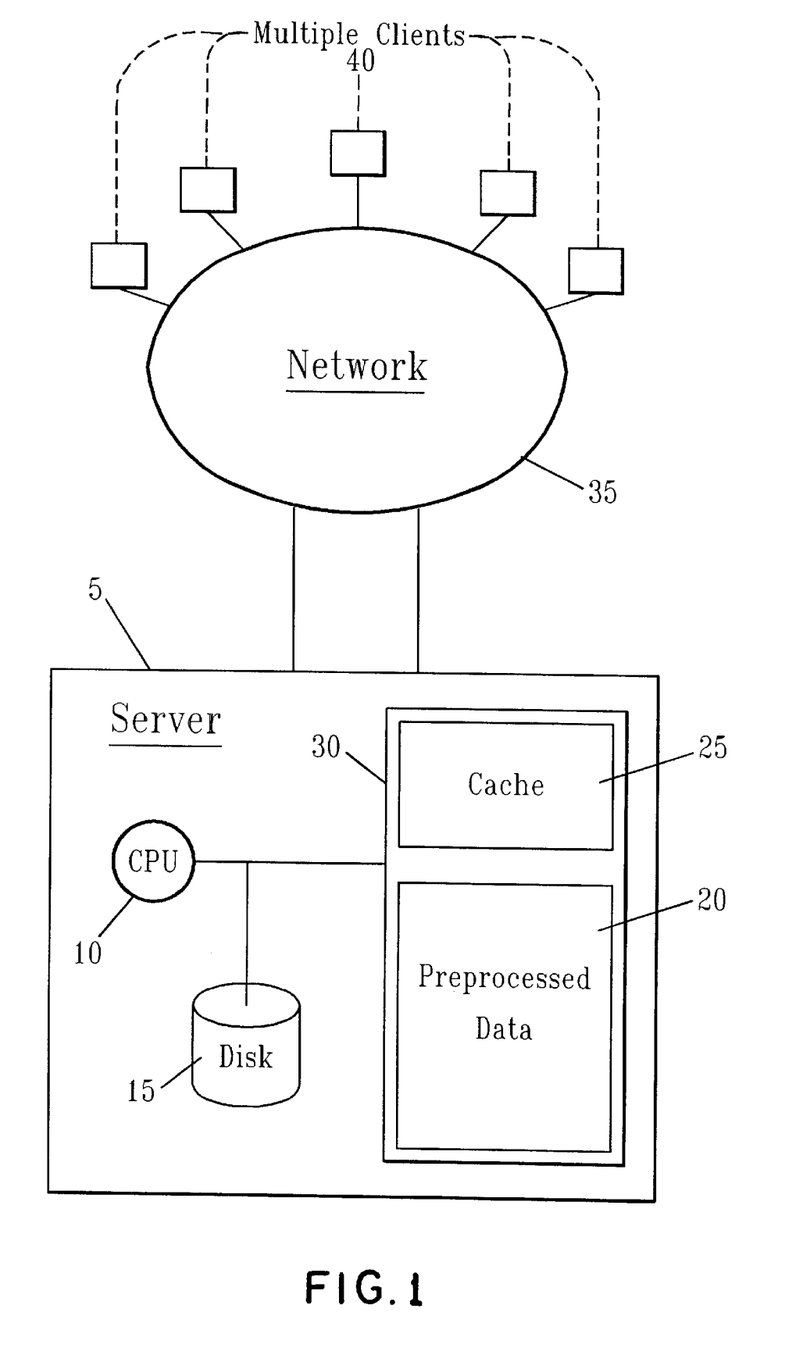
FIG. 1 is an overall description of the computer network in which this invention operates.

FIG. 1 is an overall description of the architecture of the present method. There are assumed to be multiple clients 40 which can access the preprocessed data over the network 35. The preprocessed data resides at the server 5. There may be a cache 25 at the server end, along with the preprocessed data 20. The preprocessing as well as the online processing takes place in the CPU 10. In addition, a disk 15 is present in the event that the data is stored on disk.

Figures 2A, 2B:
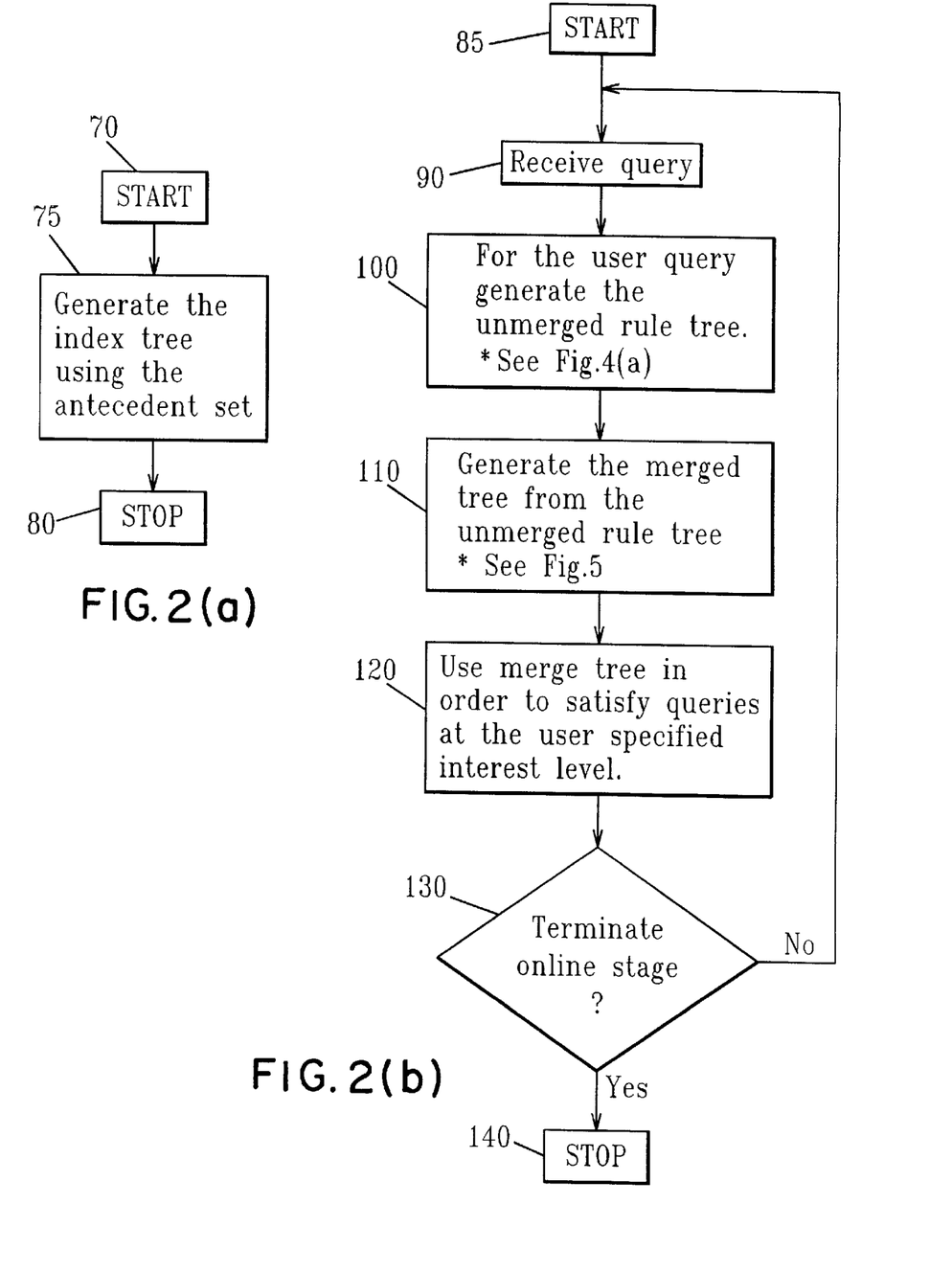
FIG. 2(a) is a description of the preprocessing stage.
FIG. 2(b) is a description of the on-line stage of the algorithm.
Figure 3A:
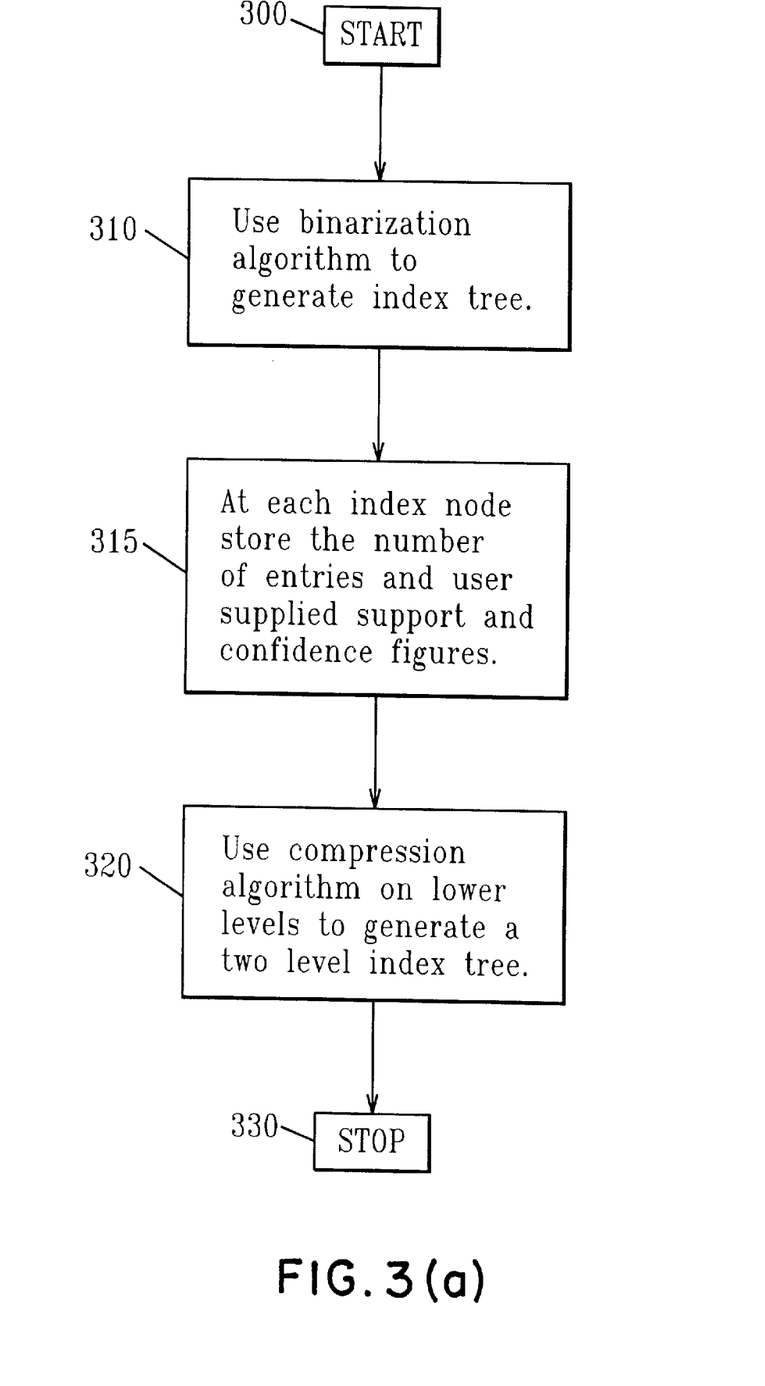
FIG. 3 is a detailed description of how the index tree is constructed using the antecedent set. It can be considered an expansion of step 75 of FIG. 2(a).

The present method comprises two stages, a pre-processing stage followed by an online processing stage. FIG. 2(*a*) shows an overall description of the preprocessing step as well as the online processing (rule generation steps) for the algorithm. The pre-processing stage involves the construction of a binary index tree structure, see step 75 of FIG. 2 and the associated detailed description of FIG. 3(*a*). The use of an index tree structure is a well known spatial data structure in the art which is used as a means to index on multidimensional data. Related work in prior art may be found in Guttman, A., *A dynamic Index Structure for Spatial Searching. Proceedings of the ACM SIGMOD Conference*. In the present method a variation on this index tree structure is employed in order to perform the on-line queries. Antecedent attributes are utilized to partition the data so as to create a multidimensional indexing structure. The indexing structure is a two-level structure where the higher level nodes are associated with at most two successor nodes and lower level nodes may have more than two successor nodes. The construction of the indexing structure is crucial to performing effective online data mining. The key advantage resides in minimizing the amount of disk I/O required to respond to user queries.

Figure 3B:
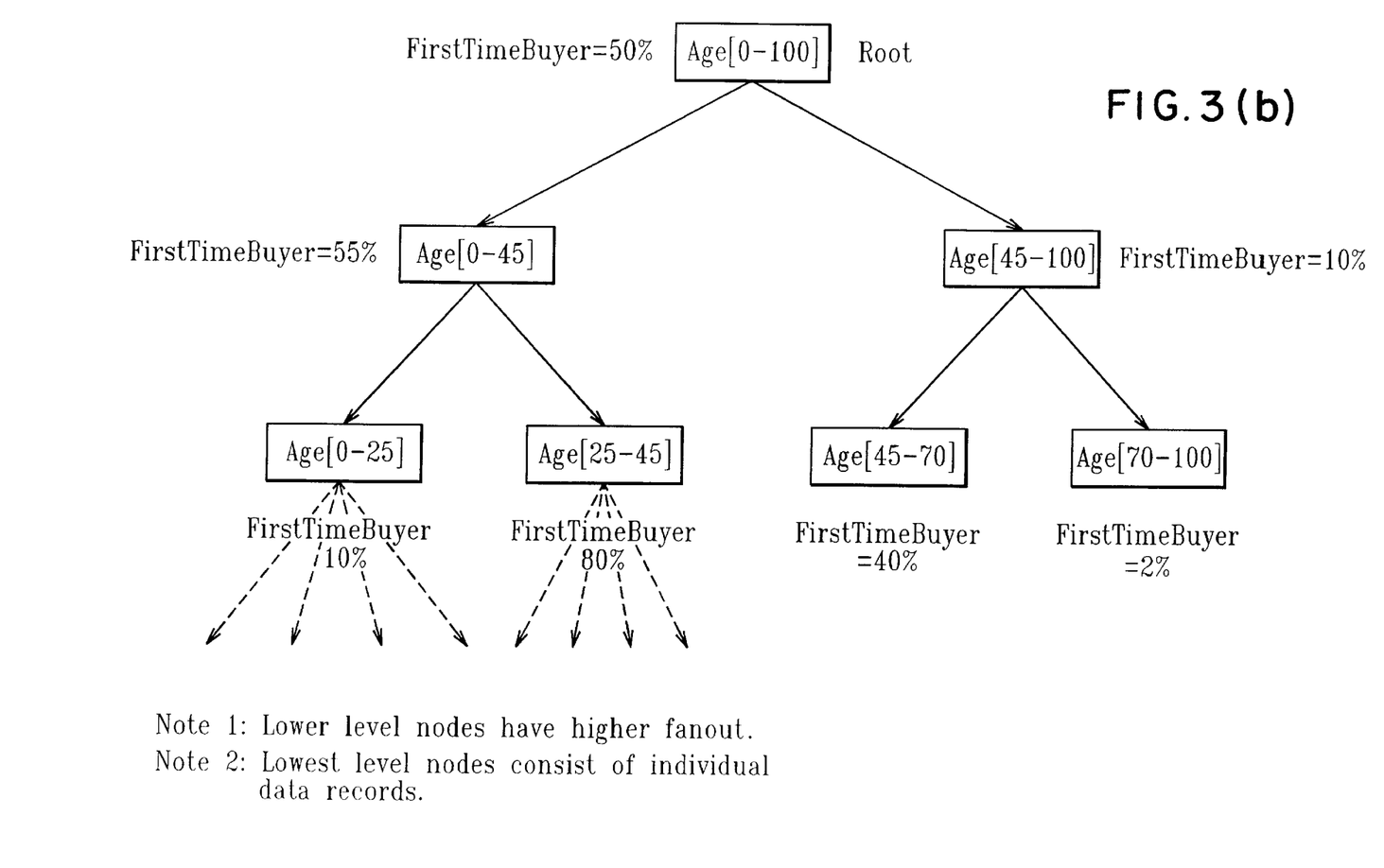

A graphical analogue of the indexing structure, stored in computer memory, is shown shown in FIG. 3(*b*) in the form of an index tree. An index tree is a well known spatial data structure which is used in order to index on multi-dimensional data. A separate index structure will be created in computer memory for each dimension, defined by a particular quantitative attribute, specified by the user in the online query. FIG. 3(*b*) is a specific example of an index tree structure which represents the antecedent condition, "Age" and its associated consequent condition, "FirstTimeBuyer". To further clarify the concept of an index tree, FIG. 3(*b*) could have represented the "Age" dimension in the example below;

EXAMPLE B

Sample User Query

| ANTECEDENT CONDITION | CONSEQUENT CONDITION |
|---|---|
| Salary[40k–85k],Age[0–100],Sex | => FirstTimeBuyer |

In general there are no restrictions with respect to the quantity or combination of quantitative and categorical attributes which comprise the antecedent and consequent conditions.

In FIG. 3(*b*) the root node of the index tree structure defines the user specified quantitative attribute, Age[0–100]. Each of the successive nodes of the tree also represent the quantitative attribute, Age, with increasingly narrower range limits from the top to the bottom of the tree heirarchy. For example, the binary successors to the root node for age [0–100] are Age[0–45] and Age[45–100]. The present method stores two pieces of data at each node of the index tree representing the confidence and support levels of interest. For example, with reference to FIG. 3(*b*), at the root node, two pieces of data are stored consisting of;

1. confidence level=50%
2. support level=function of data input to the raw database defining the confidence and support for the user query, (antecedent/consequent pair), age[0–100]=>FirstTimeBuyer at the root node.

FIG. 3(*a*) is the detailed flowchart of the preprocessing stage of the algorithm, illustrated in FIG. 2 as element 100. The process steps of this stage involve generating the binary index tree structure and storing the support and confidence levels for the consequent attribute at each node of the structure, followed by utilizing a compression algorithm on the lower levels of the structure to ensure that the index tree fits into the available memory. Step 300 is the point of entry into the preprocessing stage. Step 310 represents the software to implement the process step of using a binarization algorithm to generate a binary index tree. The binarization step has been discussed in the prior art in Aggarwal C. C., Wolf J., Yu P. S., and Epelman M. A. *The S-Tree: An efficient index tree for multidimensional index trees. Symposium of Spatial Databases*, 1997. However, the present method diverges from the prior art in at least one aspect. At Step 315, the way in which the entries of an index node are organized is unique in that both the support level and the confidence level for each value of the consequent attribute are stored at each node in the structure. Step 320 represents the software to implement the process step of utilizing a compression algorithm to compress the lower level index nodes into a single node.

Figure 4A:
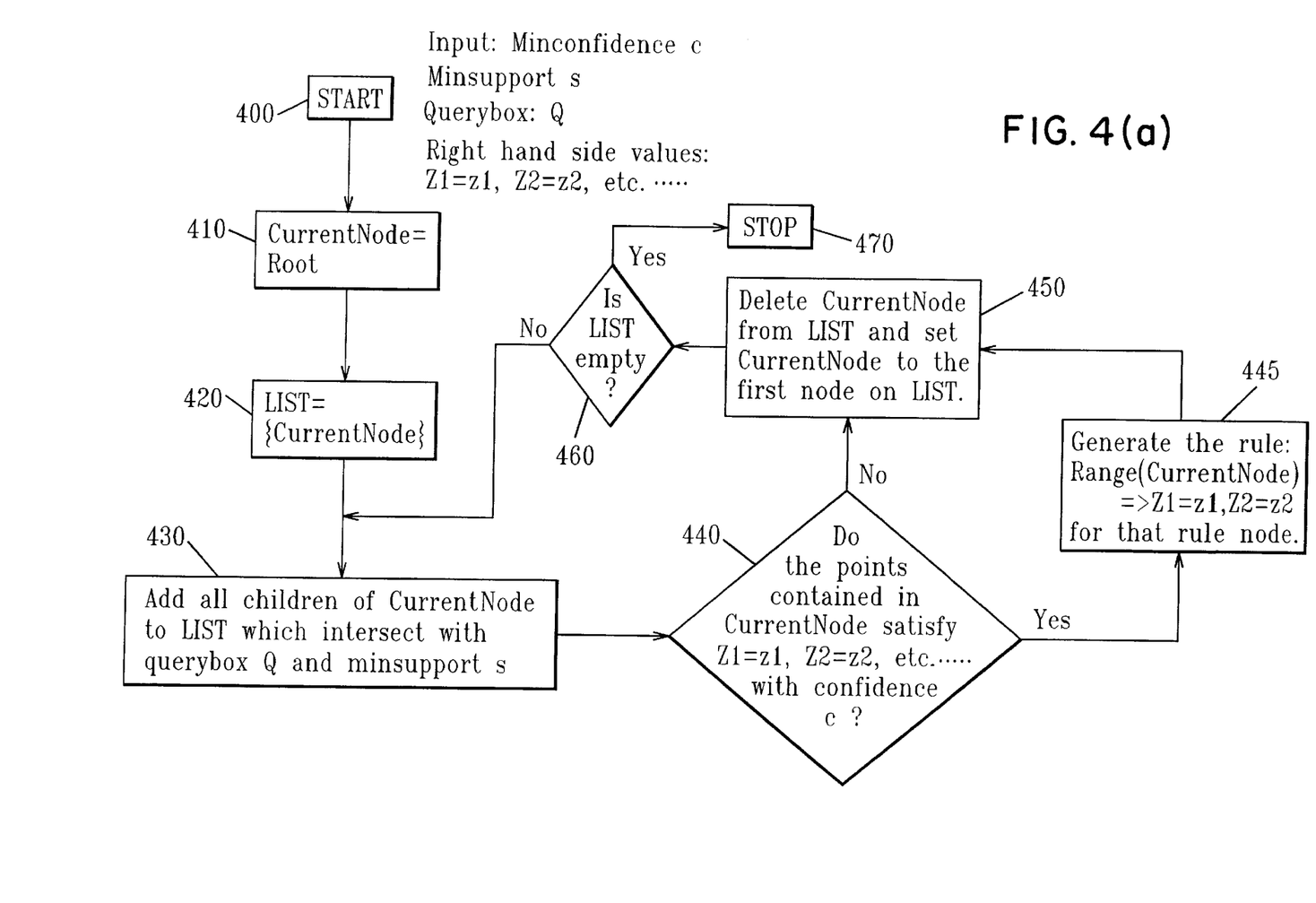
FIG. 4 is a detailed description of how the unmerged rule tree is generated from the index tree. It can be considered an expansion of step 100 of FIG. 2(b).

FIG. 4(*a*) is the detailed flowchart of the primary search algorithm which is used in order to generate the unmerged rule tree from the index tree, illustrated in FIG. 2(*b*) as element 100. The algorithm requires as input, user specified values for minconfidence c, minsupport s, and a user query which consists of a Querybox Q and one or more right hand side values, $Z1=z1$, $Z2=z2$. The Querybox is merely a descriptive term to denote the lefthand or antecedent portion of the user query. To further clarify the meaning of Querybox, Example C below describes what is required of an online user as input in the present method;

EXAMPLE C

Typical User Input

The user would specify:

(1.) a minimum confidence value, [minconfidence, c]

(2.) a minimum support value, [minsupport, s]

An online user would, in addition be required to input a user query (proposed rule) in the form of an an(antecedent/consequent) pair, items 3&4.

(3.) a Querybox, "Q" [the antecedent]

(4.) Z1=z1, Z2=z2, etc. [a consequent]

Item three, the Querybox, is further explained by the following examples, and can generally consist of any combination of quantitative and categorical attributes. Item four, the consequent attribute, can consist of one or more categorical attributes.

EXAMPLE 1

This user specified query consists of an antecedent condition, querybox, with two dimensions, Age and Lefthandedness, and a single categorical consequent condition, asmoker.

Querybox/Age[0–24], Lefthanded==>asmoker

EXAMPLE 2

This user specified query consists of an antecedent condition, querybox, with two dimensions, Height and Income and a multiple consequent condition. Querybox/Height[5–7], Income[10k–40k]==>ownsahome, ownsacar

EXAMPLE 3

The user specified query consists of a single antecedent condition, querybox, with a single dimension, Age, and a single consequent condition.

Querybox/Age[10–43]==>asmoker

Example C above, describes in general terms what a user supplies as input to the method. Example D below provides a representative example. Using the user query in example 2 above, a typical input/output result could look as follows:

EXAMPLE D

User specifies as input:

1. minconfidence=0.50
2. minsupport=0.4
3. querybox (antecedent condition)=Height[5–6], Income [10k–40k]
4. consequent condition of interest=ownsahome=1, ownsacar=1 user query formed from items (3&4):
Height[5–7], Income[10k–40k]==>ownsahome, ownsacar Resulting output: generated rule height[5.5–6.2], Income [13k–27.4k]==>ownsahome=1, ownsacar=1

In general, the output can conceivably generate no rules, one rule, or multiple rules. A single rule was generated in the example above. The generated rule is said to satisfy the user query, (antecedent/consequent pair), at the user specified confidence and support level, 0.5 and 0.4 respectively.

The algorithm for generating the unmerged rule tree from the index tree, defined by FIG. 4(a), proceeds by searching all the nodes in the index tree one by one. Step 400 is the point of entry into the primary search algorithm. Step 410 represents the software to implement the process step of setting a pointer, Currentnode to point to the root node of the index tree. Pointer CurrentNode will always point to the particular node of the index tree which the algorithm is presently searching. Step 420 defines LIST as a set of nodes which are considered to be eligible nodes to be scanned by the search algorithm. LIST is initialized to contain only the root node in step 420. Step 430 represents the software to implement the process step of adding all the child nodes of the node pointed to by Currentnode to LIST which intersect with Querybox Q, and have support at least equal to the user supplied input value, minsupport, s. A child node is said to intersect with Querybox Q, when all of the antecedent conditions associated with the child node are wholly contained within the antecedent condition defined by the Querybox. Step 440 is a decision step which determines whether the individual data records contained in CurrentNode satisfy the consequent condition, Z1=z1 and Z2=z2 at least c percent of the time. If the condition of step 440 is satisfied then the algorithm proceeds to step 445. Step 445 generates the rule corresponding to the set of attributes on the right hand side, the consequent condition. Step 450 follows steps 440 and 445 and represents the software to implement the process step of deleting the node presently pointed to by Currentnode from LIST and setting the pointer Currentnode to the next node contained in LIST. Step 460 determines whether LIST is empty and terminates the algorithm when the condition is met, see Step 470. Otherwise, the algorithm returns to step 430 and repeats the steps for the node currently pointed to by the pointer CurrentNode. Upon termination of the algorithm, an unmerged rule tree is output which consists of all nodes in the input index tree which satisfy the user specified minimum support, minsupport s.

Figure 4B:
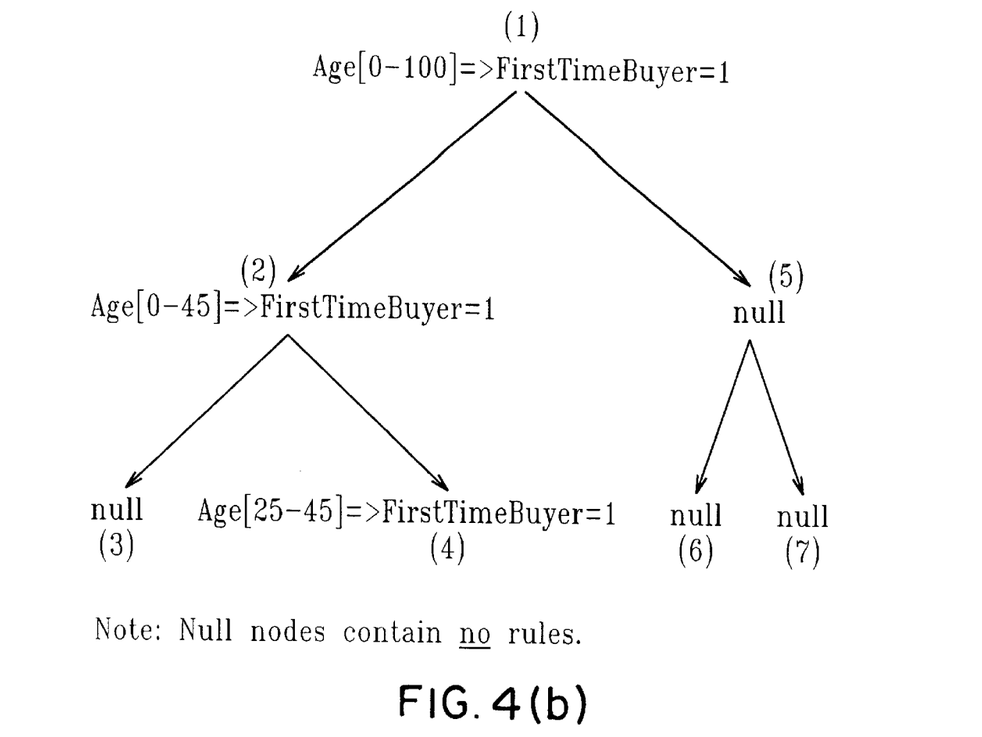
Figure 5A:
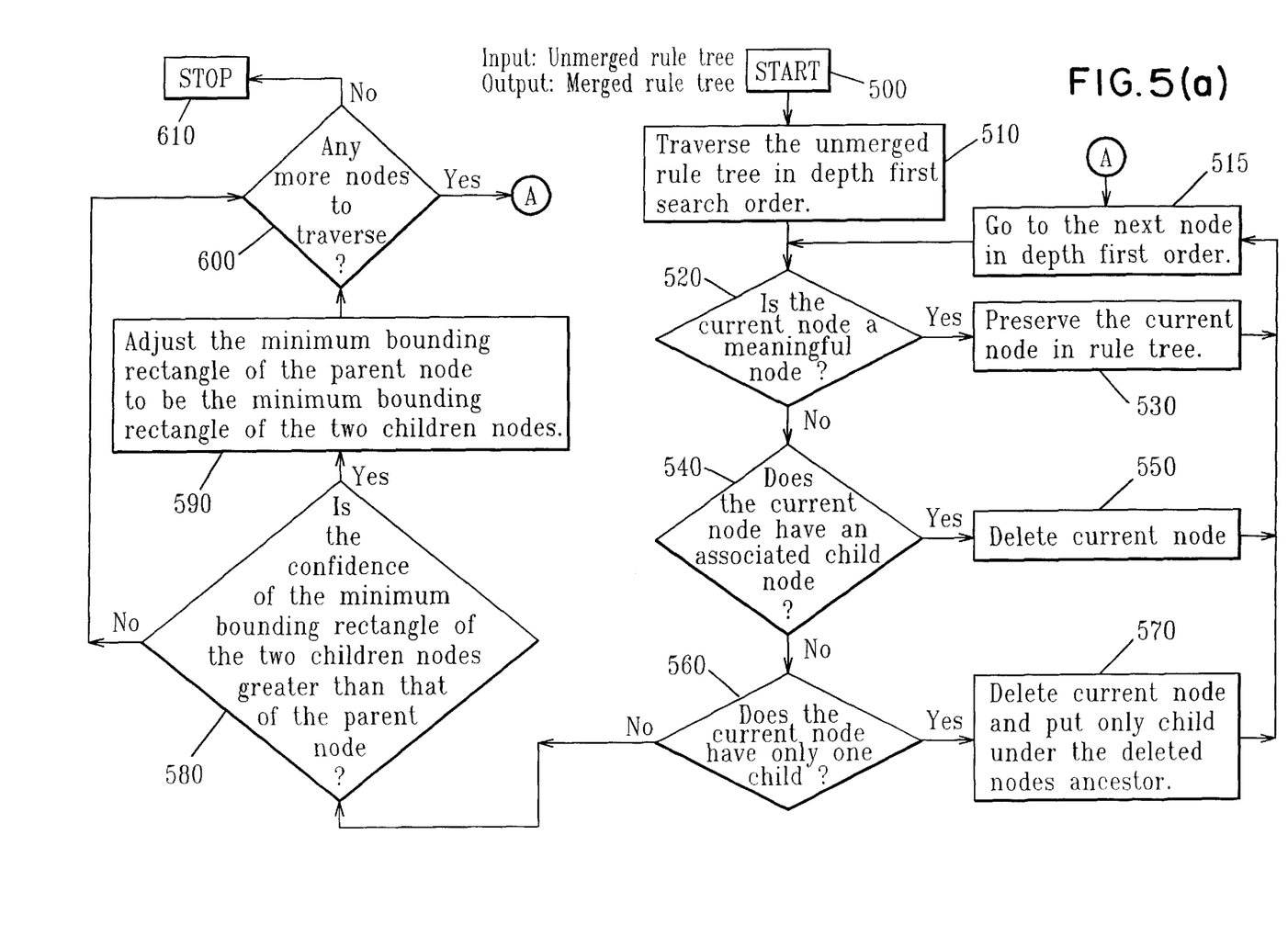
FIG. 5 is a description of how the merged rule tree is built from the unmerged rule tree.
Figure 5B:
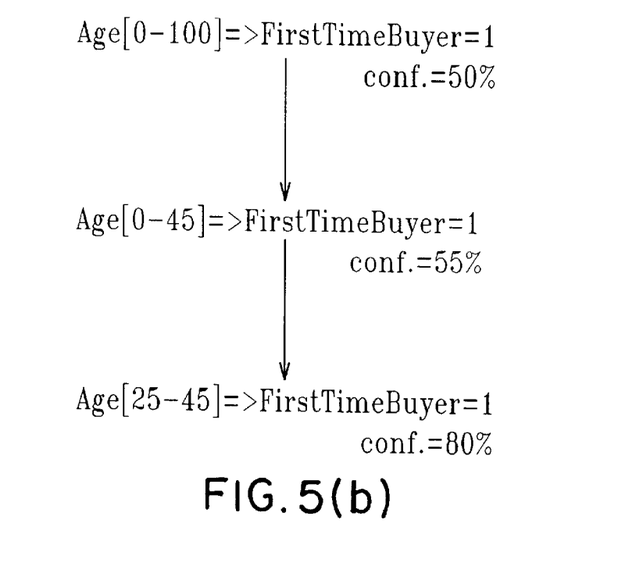

FIG. 5(a) is the detailed flowchart which describes the process of constructing the merged rule tree from the unmerged rule tree. The algorithm described by the flowchart compresses the unmerged rule tree to obtain a hierarchical representation of the rules. The unmerged rule tree is traversed in depth first search order where at each node a determination is made as to whether that node is meaningful. A meaningful node is defined to be a node which has a rule associated with it. A rule may or may not have been associated with a node when the unmerged rule tree was created. To further clarify the distinction between meaningful and nonmeaningful nodes, refer back to FIG. 4(b), the unmerged rule tree, where meaningful nodes correspond to nodes 1, 2, and 4. All meaningful nodes are preserved in the merged rule tree. If a node is determined not to be meaningful then the algorithm either eliminates that node, or merges multiple child nodes into a single node when certain conditions are met.

Step 500 represents the point of entry into the algorithm. Step 510 represents the software to implement the process step of insuring that the unmerged rule tree is traversed in depth first search order. Step 515 represents the step of proceeding to the next node in the unmerged rule tree in the depth first traversal. Step 520 represents a decision step which determines whether the current rule node is a meaningful node. A branch is made to step 530 when the current node is determined to be meaningful. Otherwise the algorithm branches to step 540 thereby classifying the node as nonmeaningful. Step 540 is a decision step which determines whether the nonmeaningful node has a child node. If the nonmeaningful node does have a child node a branch is taken to step 550. Step 550 represents the software to implement the process step of deleting the current nonmeaningful node. Otherwise, if it is determined in step 540 that the current node does not have a child node, a branch will be taken to step 560. Step 560 is a decision step for the purpose of determining whether the current nonmeaningful node has one or more than one child nodes. If the current node has only a single child node then a branch is taken to step 570. Step 570 represents the software to implement the process step of deleting the current node and directly connecting the parent and child nodes of the deleted nonmeaningful node together in the index tree. Otherwise, in the case where the current node is found to have multiple child nodes a branch is taken to step 580. Step 580 is a decision step which determines whether the minimum bounding rectangle of the two child nodes are more than that of the nonmeaningful parent node. The minimum bounding rectangle is defined by the upper and lower bounds (the range) of the quantitative attribute for each child node. When the ranges of the child nodes are combined and found to be broader than the range of the parent node, a merger occurs. For example, if the child nodes were defined as;

child node 1—age [10–20]
   child node 2—age [30–40]
   and the corresponding parent node were defined as;
   parent node—age [10–30]

then a merger would occur in this example, since the combination of the child attribute ranges yields a combined range of [10–40] which is broader than than range specified by the parent node, [10–30].

If the confidence of the minimum bounding rectangle of the two child nodes exceeds that of the parent node, a branch will occur to step 590. Step 590 represents the software to perform the process step of adjusting the minimum bounding rectangle of the parent to be the minimum bounding rectangle of the two child nodes. A branch to decision step 600 determines whether there are any more nodes to traverse in the tree. A branch to termination step 610 occurs if there are no more nodes to traverse, otherwise process steps 490–515 are repeated for the remaining index nodes.

Figure 6:
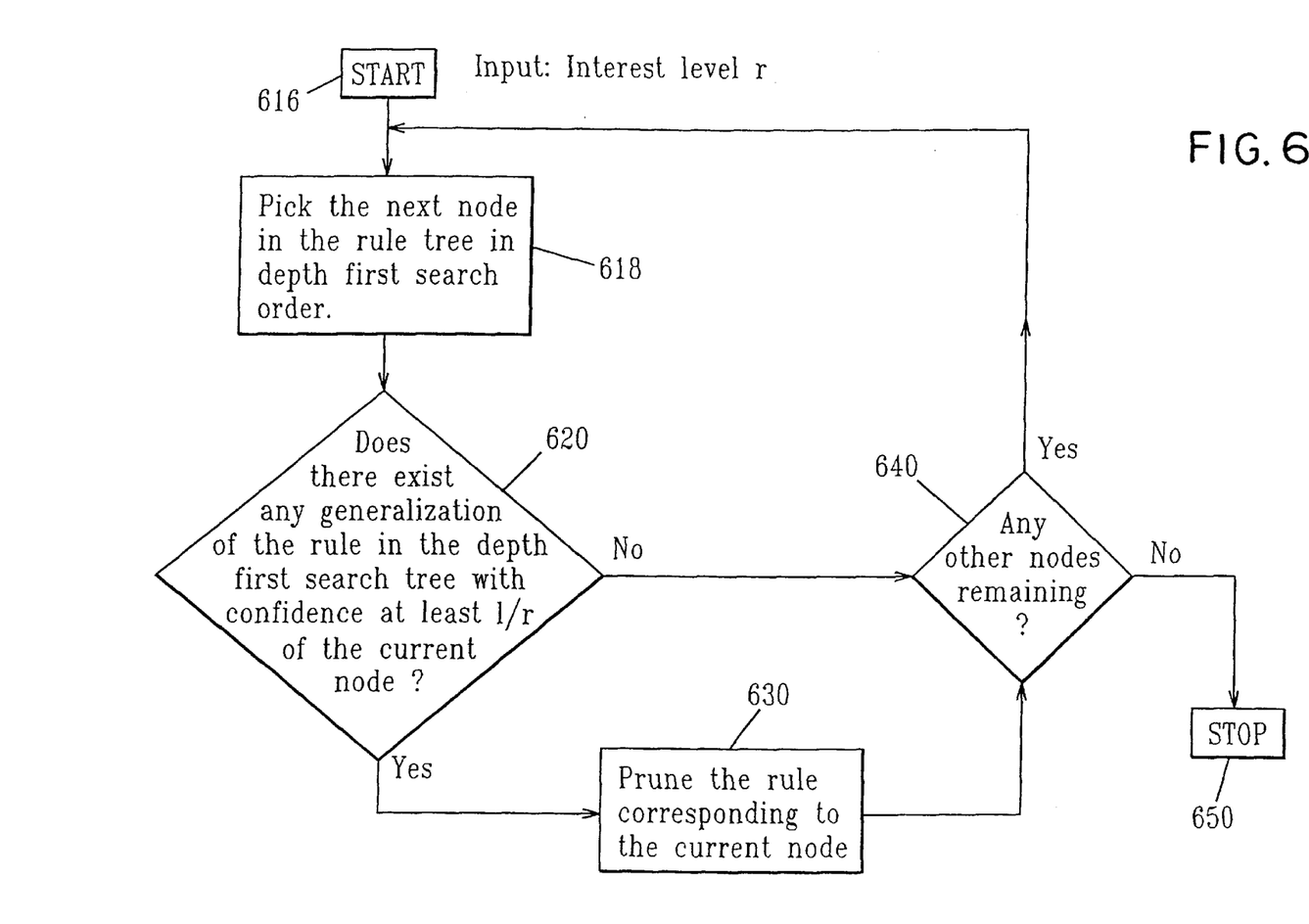
FIG. 6 is a description of how the quantitative association rules are generated from the merged rule tree at some user specified interest level r.

FIG. 6 is the detailed flowchart which describes the process of using the merged rule tree as input to define the rules at the user specified interest level r. The merged rule tree is traversed in depth first order. Step 616 is the point of entry into the flowchart. A user would specify an input value for r, representing the interest level. Step 618 represents the software to select the next node in the merged rule tree in depth first order. Step 620 is a decision step which represents the software which looks at all ancestral nodes of the current node of interest to determine whether any of them has a confidence value at least equal to 1/r of the current node. A branch to Step 630 will be taken when condition is true. Step 630 represents the software to prune the rule associated with the current node. If the condition is not met, a branch to Step 640 is taken. Step 640 is a decision step which determines whether there are any remaining nodes to be evaluated in the merged rule tree. The process steps will be repeated if there are additional nodes to be evaluated, otherwise the process terminates at this point.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A computer program device readable by a machine, tangibly embodying a program of instructions executable by the machine to perform method steps for generating quantitative association rules, the method steps comprising:

a) receiving a query including antecedent and consequent attributes where said antecedent and consequent attributes further comprise a plurality of quantitative and categorical attributes;
   b) organizing a relationship between said antecedent and consequent attributes;
   c) prestoring data defining the relationship between said antecedent attributes and data related to said consequent attributes; and
   d) deriving one or more quantitative association rules from prestored data in response to said prestoring step.

2. The computer program device of claim 1, wherein step b further comprises partitioning said antecedent data hierarchically into an index tree where said index tree comprises a multiplicity of index nodes.

3. The method of claim 2, wherein the step of partitioning said antecedent data hierarchically into the index tree further comprises:

a) storing a first value at each index node of said index tree representing the actual support; and
   b) storing a second value at each index node of said index tree representing the frequency of occurrence for each user query consequent attribute.

4. The computer program device of claim 1, said answer further comprises one or more quantitative association rules, an actual confidence value associated with each rule, an actual support value associated with each rule, and an interest level associated with each rule.

5. The computer program device of claim 4, wherein said quantitative association rules consist of only those rules which are interesting, where a interesting rules include those rules whose computed interest level is at least equal to said user defined interest level.

6. The computer program device of claim 5, wherein said interest level is defined as the minimum of a first and a second computed ratio, wherein said first ratio is defined as the actual confidence divided by an expected confidence and a second ratio is defined as the actual support divided by an expected support, wherein said expected confidence and support are computed values based on a presumption of statistical independence.

7. The computer program device of claim 1, wherein said antecedent attributes are further comprised of categorical and quantitative attributes.

8. The computer program device of claim 7, wherein said quantitative attributes are further defined by a range consisting of a lower and upper bound.

9. The method of claim 1, wherein step d further comprises the steps of:

i) searching all index nodes of said index tree to isolate those nodes whose antecedent attribute range corresponds to said user query antecedent attribute range;
   ii) selecting from those nodes which satisfy the criteria of step i, whose consequent attribute is at least equal to said user defined value of minimum confidence; and
   iii) building a merge tree from those nodes which satisfy the criteria of steps i and ii.

10. The computer program device of claim 9, wherein step iii further comprises deleting meaningless nodes and combining other nodes to create said merge tree.

11. The computer program device of claim 10, wherein a meaningless node is a node which does not have a corresponding calculated value of confidence at least equal to said user defined value of minimum confidence.

12. The computer program device of claim 10, wherein the merge tree may be built either for a single or multiple consequent attributes.

13. The computer program device according to claim 1 wherein the step of constructing a merged rule tree comprises
  a) traversing each node of the unmerged rule tree in post order;
  b) evaluating each traversed node for inclusion or exclusion in the unmerged rule tree, further comprising the steps of:
    i) determining whether each said user defined consequent attribute value is greater than the consequent attribute value stored at said node;
    ii) preserving said node in said merged rule tree when the condition of step i is satisfied;
    iii) deleting said node from said merged rule tree when the condition of step i is not satisfied and said node has no associated child nodes;
    iv) deleting said node from said merged rule tree when the condition of step I is not satisfied and said node has one child node
    v) adjusting the range of said consequent attribute when the condition of step i is not satisfied;
    vi) directly associating an ancestor node and child node of said deleted node when the condition of step iv is satisfied; and
    vii) repeating steps i–vi until all nodes have been traversed in post order.

14. A computer program device readable by a machine, tangibly embodying a program of instructions executable by the machine to perform method steps for generating quantitative association rules, the method steps comprising:
  a) receiving data including a user defined value of minimum support, a user defined value of minimum confidence, and a user query comprising an antecedent and consequent condition where said antecedent and consequent condition further comprise a plurality of quantitative and categorical attributes;
  b) constructing in memory an index tree comprised of one or more dimensions, where each dimension is defined by one of the quantitative attributes, said index tree including a plurality of index nodes where said index nodes further include a plurality of data records;
  c) constructing in memory an unmerged rule tree from said index tree;
  d) constructing in memory a merged rule tree from said unmerged rule tree;
  e) generating one or more quantitative association rules from those index nodes that satisfy said user query and whose support is at least equal to said minimum support, and whose confidence is at least equal to said minimum confidence; and
  f) displaying to a user output data including:
    said quantitative association rules from the generating step;
    a value of actual confidence associated with each generated quantitative association rule;
    a value of support associated with each generated quantitative association rule; and
    a value of interest level associated with each generated quantitative association rule.

15. The computer program device according to claim 14 wherein the step of generating quantitative association rules is repeated so that said user query is interactively modified to further define said association rules.

16. The computer program device of claim 14 wherein the step of constructing an index tree comprises the steps of:
  1) constructing a binary index tree of one or more dimensions, where each dimension is defined by one of said user supplied quantitative antecedent attributes; and
  2) storing at each index node said support level and confidence level.

17. The computer program device of claim 14 wherein the step of constructing an unmerged rule tree comprises the steps of:
  i) searching each node of said index tree; and
  ii) selecting those nodes which contain rules which satisfy the user specified consequent condition and have confidence at least equal to said user defined value of minimum confidence, and a value of support at least equal to said user defined value of minimum support.

18. The computer program device according to claim 17, wherein step ii further comprises:
  i) constructing a pointer;
  ii) equating said pointer to a root node in said index tree;
  iii) adding said node associated with said pointer to a list;
  iv) adding all children of the node pointed to by said pointer with antecedent attribute wholly contained within the parameters of said user specified antecedent attribute and have a minimum support value at least equal to said user defined minimum support;
  v) determining whether the data records stored at the node pointed to by said pointer at least equal to the user specified consequent condition and have a confidence at least equal to said user defined minimum confidence for the node pointed by said pointer;
  vi) generating a quantitative association rule associated with said consequent conditions;
  vii) deleting said node from said list when the conditions of the previous step are not satisified;
  viii) determining whether said list is empty;
  ix) terminating when said list is empty;
  x) when the condition of step ix is not satisified, equating said pointer to the next node of said index tree; and
  xi) repeating steps iii–x when the condition of step ix is not satisfied.

19. A method of online mining of a large database having a plurality of records, and each record having a plurality of quantitative and categorical items for providing quantitative association rules comprising the steps of:
  a) receiving a user query comprising antecedent and consequent attributes;
  b) organizing the relationship between said antecedent and consequent attributes;
  c) prestoring data defining the relationship between said antecedent attributes and data related to said consequent attributes; and
  d) deriving one or more quantitative association rules from prestored data in response to said user query.

20. The method of claim 19, wherein step b) further comprises partitioning said antecedent data hierarchically into an index tree where said index tree comprises a multiplicity of index nodes.

21. The method of claim 20, wherein the step of partitioning said antecedent data hierarchically into the index tree further comprises:
  a) storing a first value at each index node of said index tree representing the actual support; and
  b) storing a second value at each index node of said index tree representing the frequency of occurrence for each user query consequent attribute.

22. The method of claim 19 wherein step a) further includes receiving one or more of a user defined value of minimum confidence, a user defined value of minimum support, and a user defined value of interest level.

23. The method of claim 22 wherein step d) includes deriving one or more quantitative association rules that satisfy said user query, including said one or more of said minimum support, said minimum confidence and said interest level.

24. The method of claim 23, further including displaying to a user one or more quantitative association rules, an actual confidence value associated with each rule, an actual support value associated with each rule, and an interest level associated with each rule.

25. The method of claim 24, wherein said quantitative association rules include only those rules which are interesting, where said interesting rules include those rules whose computed interest level is at least equal to said user defined interest level.

26. The method of claim 25, wherein said interest level is defined as the minimum of a first and a second computed ratio, wherein said first ratio is defined as the actual confidence divided by an expected confidence and a second ratio is defined as the actual support divided by an expected support, wherein said expected confidence and support are computed values based on a presumption of statistical independence.

27. The method of claim 19, wherein said antecedent attributes are further comprised of categorical and quantitative attributes.

28. The method of claim 27, wherein said quantitative attributes are further defined by a range consisting of a lower and upper bound.

29. The method of claim 19, wherein step d) further comprises the steps of:
   i) searching all index nodes of said index tree to isolate those nodes whose antecedent attribute range corresponds to said user query antecedent attribute range;
   ii) selecting from those nodes which satisfy the criteria of step i, whose consequent attribute is at least equal to said user defined value of minimum confidence; and
   iii) building the merge tree from those nodes which satisfy the criteria of steps i and ii.

30. The method of claim 29, wherein step iii further comprises deleting meaningless nodes and combining other nodes to create said merge tree.

31. The method of claim 30, wherein a meaningless node is a node which does not have a corresponding calculated value of confidence at least equal to said user defined value of minimum confidence.

32. The method of claim 30, wherein the merge tree may be built either for a single or multiple consequent attributes.

33. The method according to claim 19 wherein the step of constructing a merged rule tree comprises
   a) traversing each node of the unmerged rule tree in post order;
   b) evaluating each traversed node for inclusion or exclusion in the unmerged rule tree, further comprising the steps of:
      i) determining whether each said user defined consequent attribute value is greater than the consequent attribute value stored at said node;
      ii) preserving said node in said merged rule tree when the condition of step i is satisfied;
      iii) deleting said node from said merged rule tree when the condition of step i is not satisfied and said node has no associated child nodes;
      iv) deleting said node from said merged rule tree when the condition of step I is not satisfied and said node has one child node
      v) adjusting the range of said consequent attribute when the condition of step i is not satisfied;
      vi) directly associating an ancestor node and child node of said deleted node when the condition of step iv is satisfied; and
      vii) repeating steps i–vi until all nodes have been traversed in post order.

34. A computer process of online mining for a large database having a plurality of records, each record having a plurality of quantitative and categorical items for providing quantitative association rules comprising the steps of:
   a) receiving data including a user defined value of minimum support, a user defined value of minimum confidence, a user defined value of interest, and a user query comprising an antecedent and consequent condition where said antecedent and consequent condition further comprise a plurality of quantitative and categorical attributes;
   b) constructing in memory an index tree comprised of one or more dimensions, where each dimension is defined by one of the quantitative attributes, said index tree including a plurality of index nodes where said index nodes further include a plurality of data records;
   c) constructing in memory an unmerged rule tree from said index tree;
   d) constructing in memory a merged rule tree from said unmerged rule tree;
   e) generating one or more quantitative association rules from those index nodes that satisfy said user query and whose support is at least equal to said minimum support, and whose confidence is at least equal to said minimum confidence; and
   f) displaying to a user output data including:
      said quantitative association rules from the generating step;
      a value of actual confidence associated with each generated quantitative association rule;
      a value of support associated with each generated quantitative association rule; and
      a value of interest level associated with each generated quantitative association rule.

35. The method according to claim 34 wherein the step of generating quantitative association rules is repeated so that said user query is interactively modified to further define said association rules.

36. The method according to claim 34 wherein the step of constructing an index tree comprises the steps of:
   1) constructing a binary index tree of one or dimensions, where each dimension is defined by one of said user supplied quantitative antecedent attributes;
   2) storing at each index node said support level and confidence level.

37. The method according to claim 34 wherein the step of constructing an unmerged rule tree comprises the steps of:
   i) searching each node of said index tree;
   ii) selecting those nodes which contain rules which satisfy the user specified consequent condition and have confidence at least equal to said user defined value of minimum confidence, and a value of support at least equal to said user defined value of minimum support.

38. The method according to claim 37, wherein step ii further comprises:
   i) constructing a pointer;
   ii) equating said pointer to a root node in said index tree;
   iii) adding said node associated with said pointer to a list;

iv) adding all children of the node pointed to by said pointer with antecedent attribute wholly contained within the parameters of said user specified antecedent attribute and have a minimum support value at least equal to said user defined minimum support;

v) determining whether the data records stored at the node pointed to by said pointer at least equal to the user specified consequent condition and have a confidence at least equal to said user defined minimum confidence for the node pointed by said pointer;

vi) generating a quantitative association rule associated with said consequent conditions;

vii) deleting said node from said list when the conditions of the previous step are not satisfied;

viii) determining whether said list is empty;

ix) terminating when said list is empty;

x) when the condition of step ix is not satisfied, equating said pointer to the next node of said index tree; and xi) repeating steps iii–x when the condition of step ix is not satisfied.

* * * * *